Sept. 27, 1949. W. H. DU BOIS 2,483,313
PISTON SEALING MEANS
Filed June 29, 1944
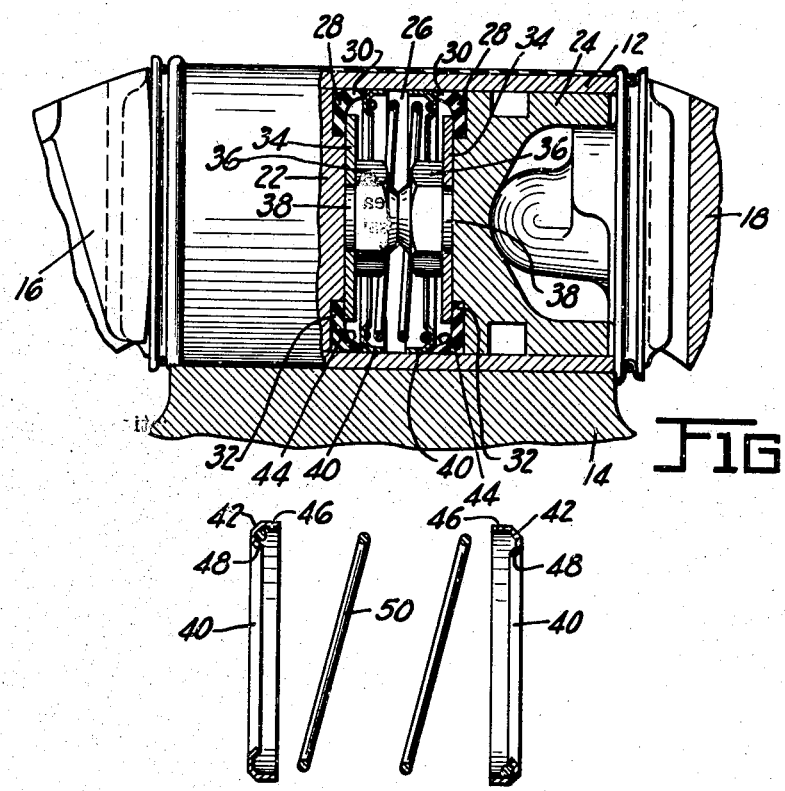
FIG.1
FIG.2
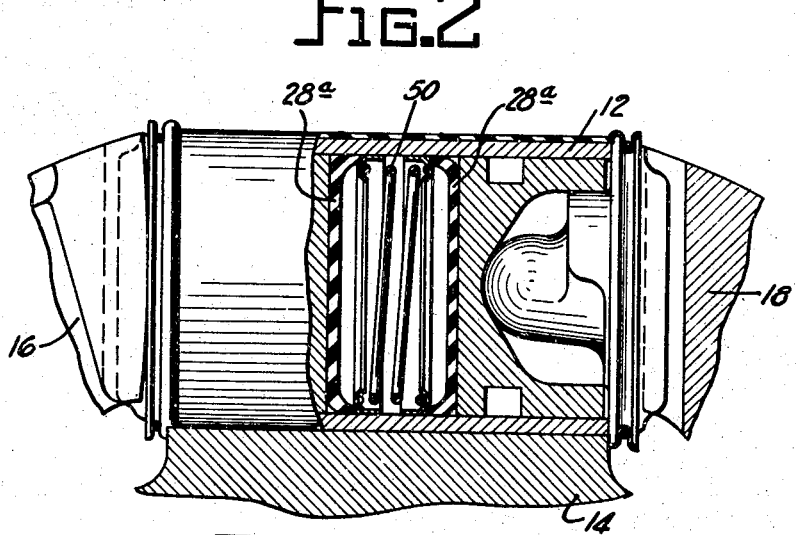
FIG.3
INVENTOR
WILLIAM H. DU BOIS
BY T. J. Plante
ATTORNEY Patented Sept. 27, 1949

2,483,313

UNITED STATES PATENT OFFICE 2,483,313

PISTON SEALING MEANS

William H. Du Bois, South Bend, Ind., assignor to Bendix Aviation Corporation, South Bend, Ind., a corporation of Delaware Application June 29, 1944, Serial No. 542,764

1 Claim. (Cl. 309—34)

This invention relates to sealing means for hydraulic pressure devices, and particularly to means for insuring effective sealing in a hydraulic system at all times, regardless of pressure variations or changes in climatic conditions. The principles of the present invention are particularly, though not exclusively, applicable to hydraulic cylinders having opposed pistons therein which are spread apart by fluid pressure, such as the wheel cylinders of a conventional hydraulic brake system.

An object of the present invention is to provide improved means for insuring effective sealing at all times in a hydraulic pressure device.

A further object of the present invention is to provide improved and simplified means for insuring effective sealing at all times in a hydraulic cylinder having opposed pistons which are spread apart by fluid pressure.

Other objects and advantages of the present invention will become apparent from the following description.

In the accompanying drawing, Figure 1 is a sectional view of a hydraulic cylinder incorporated in a brake assembly, and embodying the principles of my invention;

Figure 2 is a close-up of the seal-insuring means incorporated in the hydraulic cylinder of Figure 1; and Figure 3 shows the application of my improved seal-insuring means to a hydraulic cylinder and poston combination having a somewhat different arrangement from that of the preceding figures.

The sealing means for hydraulic brake systems, and other hydraulic systems, which serve the purposes of preventing loss of hydraulic fluid and also preventing ingress of air to the fluid lines, are usually formed of a flexible resilient material, such as rubber. In the wheel cylinders of hydraulic brakes, for example, rubber sealing members are supported on the pistons, and have sealing lips lying along the cylinder walls. In order for these lips to seal effectively, it is necessary that the rubber maintain its resilient quality, otherwise the lip "takes a set" and ceases to do an effective sealing job. It has been found that, in cold weather, the rubber of the sealing member often fails to retain its recovery characteristics or resilience and, as a result, "takes a set," which prevents fully effective sealing. This problem is particularly important in the case of synthetic rubbers, which are in widespread use at the present time.

In order to avoid these undesirable possibilities, I propose to provide positively acting means for insuring effective sealing. To do this, I use "expanders," which constantly exert a pressure against the lips of the sealing members. Although the conventional hydraulic pressure system theoretically maintains a slight positive pressure even when the brakes are released, for the express purpose of urging the lips of the sealing members to seal effectively, this residual pressure is not always sufficient for the purpose, particularly under the circumstances outlined above.

Referring to Figure 1, a hydraulic wheel cylinder 12 is mounted upon a supporting member 14 in the usual manner, and is located between the ends of brake shoes 16 and 18 in order to spread the same against the resistance of a return spring (not shown) in the conventional manner.

Reciprocable in the hydraulic cylinder 12, are a pair of opposed pistons 22 and 24 (the reference to the pistons as "a pair" does not necessarily mean they are of identical construction), which are adapted to be spread apart by fluid under pressure from the customary master cylinder entering the chamber 26 between the pistons.

Each of the pistons 22 and 24 is provided with a flexible resilient sealing element 28 which includes a lip 30 extending inwardly toward the center of the chamber 26 and lying along the wall of the cylinder, and a base portion 32, which in the instant illustration, is clamped against the face of the respective piston by means of a washer 34 and nut 36 screwed onto a threaded projection 38 of the respective piston.

The means for exerting a positive pressure to retain the lips of the sealing elements against the cylinder wall, which is shown more clearly in Figure 2, comprises two annular members 40, termed "expanders," each of which is associated with the sealing lip of one of the sealing elements. Each of the expanders 40 has an inclined outer surface 42 which contacts the inner edge of the front end of the respective sealing lip. It is desirable that the inclined surface or ramp 42 of the expander contact the sealing lip at exactly the forward inner edge of the lip, as shown, and for this reason the angle of the ramp 42 is preferably made slightly greater than the angle of the inner slope 44 of the sealing lip.

Preferably each expander 40 has a guiding flange 46 which, having substantially the same diameter as the cylinder wall, serves as a guide for the expander as a whole, thus simplifying the assembling of the wheel cylinder.

Each expander has an inwardly extending, and preferably slightly hooked, flange 48 which serves as a retainer for one end of a compression spring

50. This spring 50 is repsonsible for exerting the force necessary to maintain the sealing pressure against the lips of the sealing elements. Due to the inclination of the outer lip contacting surface 42 (which, if extended, would make an acute angle with the axis of the cylinder), the force of the spring 50 exerts a wedging action against each of the sealing lips, forcing the same outwardly against the cylinder wall. It will, of course, be understood that the spring 50 is considerably less effective than the shoe return spring.

The arrangement has the advantage of simplicity, in that a single member actuates both expanders to retain the effective seal of both sealing elements. Furthermore, since the wedging action on the sealing lips depends upon the spring force, the wedging action will be greatest when the pistons are in their innermost or released position due to the increased compressive force on the spring, and will be least when the pistons are spread apart during brake actuation. This is desirable, since the sealing effect of the spring and expanders is particularly necessary when the pistons are in released position, because then the pressure has been substantially removed from the hydraulic fluid. During brake application, when the pressure of the fluid is high, this pressure itself acts to expand the sealing lips, and to provide an effective seal.

Since the expanders are, in effect, floating with respect to the pistons, and are not permanently clamped in operating position, the lips of the sealing elements are not unduly expanded at the time the pistons are being installed or assembled in the hydraulic cylinder. It is therefore relatively easy to push the pistons into the cylinder. In the assembling operation, one of the pistons is first pushed into the cylinder with its sealing edge forward. Then the expanders and spring are dropped into place. This step is facilitated if the ends of the spring are soldered to the retaining flanges of the expanders, forming a subassembly which can be easily handled. The final step involves pushing the second piston face forward into the cylinder. Compression of the spring 50 and exertion of expanding pressure against the sealing lips does not occur until both pistons are forced toward the center of the cylinder.

The conformation of the annual expanders 40 is such that they may be made by stamping, a particularly efficient and relatively inexpensive mode of manufacture.

Figure 3 shows how the spring 50 is used to accomplish a double purpose. In this case, the sealing elements are not clamped against the faces of the respective pistons, as in Figure 1. Instead, the sealing elements are sealing cups 28a, which are in effect floating, since they rest against the front of the respective pistons. In this case, the force of the spring 50 not only expands the sealing lips of the sealing elements 28a into contact with the cylinder wall, but also retains said sealing elements in position against the forward ends of the respective pistons.

Although particular embodiments of my invention have been described, it will be understood by those skilled in the art that the object of the invention may be attained by the use of constructions different in certain respects from those disclosed without departing from the underlying principles of the invention. I therefore desire by the following claim to include within the scope of my invention all such variations and modifications by which substantially the results of my invention may be obtained through the use of substantially the same or equivalent means.

I claim:

In a hydraulic cylinder having a piston reciprocable therein and a chamber at the front of said piston to which fluid under pressure is introduced to move the piston, means for preventing escape of fluid from the chamber comprising a sealing member associated with the piston having a lip lying along the cylinder wall and extending toward the chamber, an expander associated with the sealing member constituted by a ring-shaped stamping having an inclined outer surface in contact with the forward inner edge of the lip of the sealing member and having a flange at its forward end of substantially the diameter of the cylinder arranged to serve as a guide for the expander, said expander having an annular spring-engaging surface extending inwardly from the small diameter end of said inclined outer surface and a forwardly-extending hook flange at the radially inner edge of said spring-engaging surface adapted to position one end of a spring, and a spring acting on said spring-engaging surface to exert a force through the inclined outer surface of the expander urging the lip of the sealing member outwardly into sealing contact with the cylinder wall.

WILLIAM H. DU BOIS.

REFERENCES CITED

The following references are of record in the file of this patent:

UNITED STATES PATENTS

| Number | Name | Date |
| --- | --- | --- |
| 1,121,797 | Campbell | Dec. 22, 1914 |
| 1,431,355 | Andrews | Oct. 10, 1922 |
| 1,543,505 | Middleton | June 23, 1925 |
| 1,877,081 | Teves | Sept. 13, 1932 |
| 1,894,771 | Karasinski | Jan. 17, 1933 |
| 1,943,679 | LeCour | Jan. 16, 1934 |
| 1,946,715 | Shield | Feb. 13, 1934 |
| 2,003,973 | Oliver | June 4, 1935 |
| 2,093,062 | Watson | Sept. 14, 1937 |
| 2,196,995 | LaBrie | Apr. 16, 1940 |
| 2,242,542 | Peterson | May 20, 1941 |

FOREIGN PATENTS

| Number | Country | Date |
| --- | --- | --- |
| 311,015 | Great Britain | May 29, 1929 |

OTHER REFERENCES

Plymouth Shop Manual, 1941 series, page 34, published by Chrysler Corporation, Detroit, Michigan, copy in 60/54.6M.